United States Patent [19]

Hutchins, Richard D. et al.

[11] Patent Number: 5,161,615
[45] Date of Patent: Nov. 10, 1992

[54] METHOD FOR REDUCING WATER PRODUCTION FROM WELLS

[75] Inventors: Hutchins, Richard D., Placentia; Hoai T. Dovan, Yorba Linda, both of Calif.

[73] Assignee: Union Oil Company of California, Los Angeles, Calif.

[21] Appl. No.: 724,545

[22] Filed: Jun. 27, 1991

[51] Int. Cl.$^5$ .............................................. E21B 33/138
[52] U.S. Cl. ...................... 166/295; 166/294; 166/300; 523/130
[58] Field of Search ................ 166/294, 295, 300; 523/130

[56] References Cited

U.S. PATENT DOCUMENTS

| | | | |
|---|---|---|---|
| 3,123,138 | 3/1964 | Robichaux | 166/295 |
| 3,250,330 | 5/1966 | Smith, Jr. | 166/295 |
| 3,592,267 | 7/1971 | Stainback | 166/294 |
| 3,881,552 | 5/1975 | Hessert | 166/294 |
| 3,964,923 | 6/1976 | Zetmeir | 166/294 X |
| 4,276,935 | 7/1981 | Hessert et al. | 166/294 X |
| 4,328,864 | 5/1982 | Friedman | 166/295 X |
| 4,572,295 | 2/1986 | Walley | 166/295 |
| 4,899,818 | 2/1990 | Jennings, Jr. et al. | 166/295 X |
| 4,903,766 | 2/1990 | Shu | 166/295 X |
| 4,958,685 | 9/1990 | Hihara et al. | 166/295 X |
| 5,086,841 | 2/1992 | Reid et al. | 166/294 X |

*Primary Examiner*—George A. Suchfield
*Attorney, Agent, or Firm*—Gregory F. Wirzbicki; Shlomo R. Frieman

[57] ABSTRACT

Water production from a wellbore is reduced by sequentially or simultaneously injecting (a) a hydrophilic polymer-containing organic carrier fluid and (b) a crosslinking agent-containing fluid into at least a portion of a subterranean formation. The cross-linking agent reacts with the polymer in the presence of water to form a gel in at least a portion of the subterranean formation. The gel obstructs the flow of water in the subterranean formation, thereby reducing the production of water from the wellbore.

40 Claims, No Drawings

METHOD FOR REDUCING WATER PRODUCTION FROM WELLS

BACKGROUND

The present invention relates to (a) methods for reducing water production from wellbores, (b) compositions used in such methods, and (c) enhanced recovery systems treated by such methods.

Permeable subterranean formations often contain water, in many instances in the form of aqueous brines. Because this water is capable of flowing through the formation under appropriate conditions, its presence sometimes interferes with the recovery of hydrocarbons, such as oil and gas, from the formation. For example, during the recovery of hydrocarbons through a wellbore drilled into the formation, water may flow from the formation into the wellbore, thereby reducing hydrocarbon production. Excessive water flow may render the production of hydrocarbons uneconomical or reduce reservoir pressure to such an extent that hydrocarbon recovery is impossible.

To counteract the presence of water in a subterranean formation, U.S. Pat. No. 4,572,295 (Walley) introduces a nonaqueous treatment agent into that portion of the subterranean formation in which water permeability is to be reduced. Walley's non-aqueous treatment agent comprises a hydrogel polymer or copolymer that is preferably suspended in a non-aqueous fluid carrier. The hydrogel polymer swells or absorbs water when contacted by the water present in the subterranean formation. The hydrogel polymers of Walley are preferably lightly crosslinked.

SUMMARY

Walley's process is fraught with drawbacks. For example, because the hydrogel polymers employed by Walley are either not crosslinked or only lightly crosslinked, their ability to block the flow of water in the subterranean formation tends to decrease over time as the polymers are displaced within the formation. In addition, since Walley's process relies on the swelling of the polymer upon contact with water to block subterranean pores, the polymers suitable for use by Walley are restricted to water swellable polymers. Also, the particle size of the polymer is critical—a polymer having too small a particle size, even after swelling, would be incapable of blocking certain pores and a polymer having too large a particle size would be incapable of passing through the smaller pores. Additionally, swelling of Walley's polymer is dependent upon the polymer absorbing water from the formation—a variable that can potentially cause significant down time since the water seepage rate can be very slow. Furthermore, at least one technique taught by Walley for reducing this down time, namely, withdrawing the carrier fluid from the formation, is also counterproductive because the withdrawn carrier fluid very likely also contains some polymer—the active ingredient needed to plug the water-containing pores.

The present invention provides a method for reducing the production of water from wellbores without many, if not all, of the drawbacks of Walley. In accordance with this invention, a gel is formed in situ within the formation. The gel tends to block water production for a longer period of time than Walley's uncrosslinked or lightly crosslinked hydrogel polymers. In addition, by forming a gel, the particle size of the polymer is not as critical (needing only to be small enough to pass through the subterranean pores). Also, the polymer employed in the present invention is not limited to water swellable polymers but encompasses the broader category of crosslinkable, hydrophilic polymers. As used in the specification and claims, the term "hydrophilic polymer" means a polymer having a solubility (a) in water of at least about 0.5 weight percent based on the combined weight of polymer and water and (b) a solubility in methanol of less than about 0.05 weight percent based upon the combined weight of polymer and methanol. Furthermore, in most embodiments of the invention, the formation of the gel and, therefore, the reduction in water production, is not dependent on the migration of subterranean water in the polymer-containing or treated portion of the subterranean formation.

In general, the gel is formed by injecting a crosslinkable, hydrophilic polymer-containing organic carrier fluid and a crosslinking agent-containing fluid into at least a portion of a subterranean formation. The crosslinking agent reacts with the polymer in the presence of water to form the gel in at least a portion of the subterranean formation. The water is preferably introduced into the subterranean formation as the liquid phase of the crosslinking agent-containing fluid or as a separate slug or as the aqueous portion of a polymer-containing water-in-oil emulsion. Alternatively, the water is indigenously present in the formation. In one embodiment of the invention, the crosslinkable, hydrophilic polymer and crosslinking agent are both present in an organic-based fluid (for example, the organic carrier fluid or a water-in-oil emulsion) and, therefore, simultaneously injected into the formation.

The invention also encompasses an enhanced hydrocarbon recovery system comprising a subterranean formation and a wellbore penetrating at least a portion of the subterranean formation. In one version of this embodiment of the invention, the gel is located in at least a portion of the subterranean formation. In another version, the crosslinkable, hydrophilic polymer- and crosslinking agent-containing organic-based fluid is present in at least a portion of the wellbore.

DETAILED DESCRIPTION OF THE INVENTION

The crosslinkable, hydrophilic polymers employed in the present invention preferably have a solubility (a) in water of at least about 5 weight percent (more preferably at least about 10 weight percent) based on the combined weight of polymer and water and (b) a solubility in methanol of less than about 0.005 weight percent (more preferably at least about 0.0005 weight percent) based upon the combined weight of polymer and methanol. Common classes of crosslinkable, hydrophilic polymers include polyvinyl polymers, polymethacrylamides, cellulose ethers, polysaccharides, and ammonium salts and alkali metal salts thereof. Specific examples of typical crosslinkable, hydrophilic polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxyalkylcelluloses (e.g., carboxymethylcellulose), carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred crosslinkable, hydrophilic polymers include hydroxypropyl guar, partially hydrolyzed polyacrylamides, xanthan gum, polyvinyl alcohol, acrylic acid-acrylamide copolymers, and the ammonium and alkali metal salts thereof.

The crosslinkable, hydrophilic polymer is commercially available in a water solution or broth, a dried powder, a water-in-oil emulsion, and as a dispersion in an organic fluid. The commercially available water solutions or broths are made into water-in-oil emulsions and the commercially dried powders are made into dispersions using techniques known to those skilled in the art. While commercially available dispersions and water-in-oil emulsions are useable as purchased, preferably they are diluted with an organic carrier fluid (described below).

The droplets present in the water-in-oil emulsion and the solid polymer particles present in the dispersion preferably have a maximum cross-sectional measurement of less than about 2 microns, and more preferably less than about 0.5 microns. Alternatively, the droplets present in the water-in-oil emulsion and the solid polymer particles present in the dispersion are preferably capable of entering at least 50 percent (and more preferably at least about 75 percent) of the pores within the subterranean formation. Various techniques, such as the mercury porosimeter test, are used to measure subterranean pore size distribution.

With respect to the crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, resorcinol, glutaraldehyde, catechol, formaldehyde, and divinylether are some of the more common organic crosslinking agents. Typical inorganic crosslinking agents are polyvalent metals, chelated polyvalent metals, and compounds capable of yielding polyvalent metals. Some of the more familiar inorganic crosslinking agents include chromium salts, aluminates, gallates, dichromates, titanium chelates, aluminum citrate, chromium citrate, chromium acetate, chromium lactate, and chromium propionate.

Regarding the organic carrier fluid, exemplary organic carrier fluids include, but are not limited to (a) petroleum derivatives such as kerosene, diesel oil, mineral oil, lube oil, and crude oil, (b) alcohols such as methanol and isopropanol, and (c) solvents such as toluene, xylene, and acetone. The organic carrier fluid is optionally gelled, e.g., with sodium aluminate. In addition, mixtures of the above organic carrier fluids are also used in the invention.

Typically, the crosslinkable, hydrophilic polymer is present in the organic carrier fluid in a concentration of about 0.5 to about 75 weight percent based upon the combined weight of the crosslinkable, hydrophilic polymer and the organic carrier fluid. Preferably, about 0.75 to about 20, and more preferably about 1 to about 5, weight percent of the crosslinkable, hydrophilic polymer is present in the organic carrier fluid.

When the crosslinking agent and crosslinkable, hydrophilic polymer are both present in the organic carrier fluid, the crosslinking agent is generally present in a concentration of about 0.003 to about 1, preferably about 0.01 to about 0.1, and more preferably about 0.03 to about 0.06, parts by weight crosslinking agent per part by weight crosslinkable, hydrophilic polymer.

When the crosslinking agent is present in a separate slug, the separate slug usually comprises about 10 to about 20,000, preferably about 50 to about 10,000, and more preferably about 100 to about 5,000, ppm by weight crosslinking agent. The separate slug is either water-based (e.g., aqueous solutions) or organic-based (e.g., organic carrier fluid solutions, water-in-oil emulsions, and dispersions). Crosslinking agent-containing aqueous solutions are made using water soluble crosslinking agents (such as polyvalent metals, aldehydes, phenol, and substituted phenols). Organic carrier fluid soluble crosslinking agents (e.g., divinylether, aldehydes, phenol, and substituted phenols) are employed in preparing crosslinking agent-containing organic carrier fluid solutions. Crosslinking agent-containing water-in-oil emulsions and dispersions are formulated using one or more partially insoluble crosslinking agents. In the case of crosslinking agent-containing water-in-oil emulsions and dispersions, the droplets present in the water-in-oil emulsions and the solid crosslinking agent particles present in the dispersions preferably have a maximum cross-sectional measurement of less than about 2 microns, and more preferably less than about 0.5 microns. Alternatively, the droplets present in the water-in-oil emulsion and the solid crosslinking agent particles present in the dispersion are preferably capable of entering at least 50 percent (and more preferably at least about 75 percent) of the pores within the subterranean formation.

In one version of the invention, water production from a wellbore penetrating at least a portion of a subterranean formation is reduced by sequentially injecting into at least a portion of the subterranean formation (a) a slug of a crosslinkable, hydrophilic polymer-containing organic carrier fluid, (b) a spacer fluid, and (c) a slug of a crosslinking agent-containing fluid. This injection sequence is performed once or repeated as often as necessary to accomplish the desired result. When the sequence is repeated a plurality of times, another spacer fluid is injected into at least a portion of the subterranean formation between the slug of crosslinking agent and the following slug of the crosslinkable, hydrophilic polymer-containing organic carrier fluid.

Each spacer fluid is an organic fluid (e.g., the organic carrier fluid) substantially or totally devoid of the crosslinkable, hydrophilic polymer and the crosslinking agent. As used in the specification and claims with reference to the organic fluid, the phrase "substantially devoid of the crosslinkable, hydrophilic polymer" means that the organic fluid contains less than about 0.1 weight percent crosslinkable, hydrophilic polymer based upon the combined weight of the crosslinkable, hydrophilic polymer and the organic fluid; the phrase "totally devoid of the crosslinkable, hydrophilic polymer" means that the organic fluid contains less than about 0.001 weight percent crosslinkable, hydrophilic polymer based upon the combined weight of the crosslinkable, hydrophilic polymer and the organic fluid; the phrase "substantially devoid of the crosslinking agent" means that the organic fluid contains less than about 0.001 weight percent crosslinking agent based upon the combined weight of the crosslinking agent and the organic fluid; and the phrase "totally devoid of the crosslinking agent" means that the organic fluid contains less than about 0.0001 weight percent crosslinking agent based upon the combined weight of the crosslinking agent and the organic fluid.

The volume of each slug of injected crosslinkable, hydrophilic polymer-containing organic carrier fluid is usually about 1 to about 10,000, preferably about 10 to about 5,000, and more preferably about 50 to about 1,000, barrels per foot of pay zone. As used in the specification and claims, the term "pay zone" means the thickness of the subterranean formation open to the wellbore for producing hydrocarbon fluids from the subterranean formation. The volumetric ratio of crosslinkable, hydrophilic polymer-containing organic carrier fluid to the crosslinking agent-containing fluid slug is generally about 0.01:1 to about 100:1, preferably about 0.02:1 to about 50:1, and more preferably about 0.1:1 to about 10:1 based upon the most recently, previously injected slug of the crosslinkable, hydrophilic polymer-containing organic carrier fluid. In addition, the volumetric ratio of the most recently, previously injected slug of crosslinkable, hydrophilic polymer-containing organic carrier fluid to each injected spacer slug is typically about 5:1 to about 100:1 and preferably about 10:1 to about 50:1.

Optionally, prior to injecting the slug of the crosslinkable, hydrophilic polymer-containing fluid, water is displaced or removed from the wellbore by injecting a slug of the organic fluid (e.g., the organic carrier fluid and preferably methanol and/or acetone) substantially or totally devoid of the crosslinkable, hydrophilic polymer into the wellbore. Alternatively, the water is removed from the wellbore by circulating the organic fluid through the annular space present either (a) between the production tubing and the casing or (b) between an inserted coiled tubing and the production tubing. In both embodiments discussed in this paragraph, the volume of a water immiscible organic fluid employed is generally at least about one, and preferably about two to about five times the wellbore volume, with the volume of a water miscible organic fluid being roughly double that employed when using the water immiscible organic fluid.

Another optional step involves displacing the portion of the previously injected slug or slugs still remaining in the wellbore. The displacement step is accomplished by injecting a fluid into the wellbore. Both aqueous fluids (e.g., water) and organic fluids (e.g., organic carrier fluids) are suitable for use as the displacing fluid, except when the last slug injected into the wellbore contains the crosslinkable, hydrophilic polymer In this latter event an organic fluid (e.g., the organic carrier fluid) should be used. Preferably, the displacing fluid is lease crude oil (i.e., oil produced from the subterranean formation). The lease crude oil tends to establish oil permeability near the treated wellbore. It is also preferred to overdisplace the previously injected slugs into the formation.

Regardless of whether the optional step discussed in the preceding paragraph is performed, the forward front of the crosslinkable, hydrophilic polymer-containing slug is generally injected into the formation for a distance of usually about 1 to about 100, preferably about 5 to about 50, and more preferably about 10 to about 30, feet from the wellbore.

In another version of the invention, an organic carrier fluid-based slug comprising both the crosslinkable, hydrophilic polymer and the crosslinking agent (e.g., in the form of a water-in-oil emulsion or a dispersion) is injected into the wellbore and into at least a portion of the subterranean formation. The volume of this injected slug is generally about 1 to about 10,000, preferably about 10 to about 5,000, and more preferably about 50 to about 1,000, barrels per foot of pay zone. This crosslinkable, hydrophilic polymer- and crosslinking agent-containing slug can be injected a plurality of times, each such slug being separated by a slug of the organic fluid substantially or totally devoid of the crosslinkable, hydrophilic polymer and crosslinking agent. Alternatively, sequential injections of (a) a slug of the organic fluid substantially or totally devoid of the crosslinkable, hydrophilic polymer and crosslinking agent, (b) an aqueous medium (e.g., water), and (c) another slug of the organic fluid substantially or totally devoid of the crosslinkable, hydrophilic polymer and crosslinking agent are employed to space apart successive slugs of the organic carrier fluid comprising both the crosslinkable, hydrophilic polymer and the crosslinking agent.

In these latter versions, water in the wellbore is also optionally first removed or displaced by the same techniques described above. Also, the above described displacing fluids are optionally employed to displace the portion of the previously injected slug or slugs still remaining in the wellbore. Generally, a sufficient volume of the organic carrier fluid-based slug containing both the crosslinkable, hydrophilic polymer- and the crosslinking agent, either by itself or in conjunction with one or more subsequently injected fluids, is injected into the formation for the forward front of the crosslinkable, hydrophilic polymer- and the crosslinking agent-containing organic carrier fluid-based slug to penetrate the formation for about 1 to about 100, preferably about 5 to about 50, and most preferably about 10 to about 30, feet from the wellbore.

EXAMPLES

The following examples—which are intended to illustrate and not limit the invention—demonstrate the improved reduction in water production obtained by an exemplary process of the present invention (Example 1); describe a procedure for selecting preferred crosslinking agents (Examples 2–9); and illustrate a prophetic embodiment of the invention (Example 10).

EXAMPLE 1

A sandpack was prepared using Nevada 130 grade sand sold by Brumley-Donaldson, Huntington Park, Calif. After saturating the sandpack with water and oil, the permeability of the sandpack was calculated at the residual saturations. All permeability calculations were performed by inserting experimental data in Darcy's equation for fluid flow through porous media.

A slug (about 40% pore volume) of freshly mixed polymer (about 10 weight percent Nalflo 3857 brand emulsion containing about 35.5 weight percent polyacrylamide in a low odor petroleum solvent and about 90 weight percent heavy mineral oil) was then injected into the sandpack. All fluids were injected using a positive displacement pump. A spacer of mineral oil (about 8% pore volume) was injected next. The next day, a KCl solution (about 2 wt %), mineral oil, and another 2 wt % KCl solution were sequentially injected. The permeability of each injected fluid in the sandpack was then calculated.

Next, an aqueous solution containing a crosslinking agent was injected into the sandpack, followed by another injection of the 2 wt % KCl solution. The permeability of this latter 2 wt % KCl solution was also calculated. The following Table I shows the calculated permeability of the sandpack after each step of the flood.

TABLE I<sup>a</sup>

| Sandpack Permeability | |
|---|---|
| Flooding Agent | Permeability, md |
| Light Mineral Oil | 630 |
| 2 wt % KCl solution | 338 |
| Inject Emulsion, 40% pore volume | |
| Inject Light Mineral Oil, 8% pore volume | |
| 2 wt % KCl solution | |
| Initial | 1.0 |
| After injecting 2 pore volumes | 2.7 |
| After injecting 10 pore volumes | 33.4 |
| Light Mineral Oil | 332 |
| 2 wt % KCl solution | 11.6 |
| Inject 200 ppm Cr as chromium acetate in 2 wt % KCl solution (about 40% pore volume) | |
| 2 wt % KCl solution | 0.036 |

<sup>a</sup>The permeabilities listed in Table I were measured when the noninjected phase was no longer produced. For example, after injecting about 1 pore volume of a 2 wt % KCl solution, no more oil was produced and the permeability was measured. Similarly, when injecting mineral oil, the permeability was measured after water production had ceased. These measurement conditions are known to those skilled in the art as relative permeability measured at residual phase saturation.

The data set forth above in Table I indicates that a swellable polymer (acrylic acid-acrylamide copolymer) reduced the water permeability by a factor of about 30 while only reducing the oil permeability by a factor of about 2. However, by crosslinking the polymer to form a gel in accordance with the present invention, the water permeability is significantly reduced even further—by a factor of about 9,000! While the gel, if present, may also block oil production, the gel tends not to form in zones containing predominantly oil since the injected polymer-containing fluids are inclined to overwhelmingly enter the water producing zones because of the much greater permeability possessed by water producing zones. In addition, the water bearing zone is preferably isolated prior to conducting the water reduction process of the present invention using mechanical means (for example, bridge plug and packer, opposed washer cups, and straddle packer assembly) well known to those skilled in the art.

EXAMPLES 2-9

Dispersion Polymer—Stability and Gelation

Heavy mineral oil (about 90 ml) was mixed with about 10 ml of Allied Colloids 1175L brand dispersion acrylamide-acrylic acid copolymer (comprising about 30 mole percent acrylic acid and about 70 mole percent acrylamide and having a viscosity average molecular weight of at least about 10 million) in a 100 ml graduated cylinder. The contents of the graduated cylinder were observed each hour for about the next eight hours and then once a day for a period of about one week. No separate phases were observed during the observation period.

Each of the crosslinking agents listed in the following Table II were ground in a mortar with a pestle to a fine powder. The amount of each crosslinking agent shown in Table II was added to about 10 g separate aliquots of the above heavy mineral oil/dispersion acrylamide-acrylic acid copolymer combination. The resulting mixture was observed for thickening or gelation one hour later and the following two days. None of these mixtures exhibited any thickening or gelation. After each mixture had stood for about two days, about 10 g of water was added to each mixture and the resulting composition was shaken. Table II also indicates the observations noted for each resulting composition after the addition of water.

TABLE II

| Crosslinking Agent | Grams | Observation After Water Addition |
|---|---|---|
| $Na_2AlO_4$ | 0.085 | Gel |
| $Al_2(SO_4)_3 \cdot 18H_2O$ | 0.345 | Gel + Water |
| $AlCl_3 \cdot 6H_2O$ | 0.138 | Gel + Water |
| $Cr(CH_3COO)_3$ | 0.123 | Gel |
| $CrCl_3 \cdot 6H_2O$ | 0.143 | Clumpy Gel + Water |
| $VOSO_4$ | 0.089 | Clumps |
| $Cr(NO_3)_3 \cdot 9H_2O$ | 0.216 | Clumpy Gel + Water |
| $Co(NO_3)_2 \cdot 6H_2O$ | 0.133 | Gel |

Accordingly, all of the above crosslinking agents can be employed in the process of the present invention, with the preferred crosslinking agents being $Na_2AlO_4$, $Cr(CH_3COO)_3$, and $Co(NO_3)_2 \cdot 6H_2O$.

EXAMPLE 10

An oil well producing at a high water to oil ratio is treated to reduce water production. The perforated thickness (pay zone) is about 10 feet beginning at a depth of about 4,600 feet below sea level. The reservoir temperature is about 150° F. and the well is completed with a packer set at about 4,400 feet. The displaced volume of the wellbore including tubing volume and casing volume below the packer is about 30 barrels.

Diesel oil (about 60 barrels) is injected into the wellbore to remove water from the wellbore. Next, about 100 barrels of a fluid containing about 10 barrels of Allied Colloids 1175L brand dispersion polymer and about 90 barrels of diesel oil is mixed in a blender and injected into the wellbore and into at least a portion of the pay zone. A spacer of about 10 barrels of diesel oil is then injected into the wellbore, followed by about 50 barrels of an aqueous crosslinking agent-containing solution having a pH of about 11 and containing about 3,000 ppm sodium aluminate. The crosslinking agent-containing solution is displaced from the wellbore by injecting about 45 barrels of lease crude oil and the well is shut in for about three days. A pump is placed into the wellbore and the oil and water production rates are determined.

Although the present invention has been described in considerable detail with reference to some preferred versions, other versions are possible. For example, the process of the present invention can be used to reduce water production from a subterranean formation to enhance the production of non-hydrocarbons (e.g., helium, hydrogen sulfide, and carbon dioxide) from the formation. Therefore, the spirit and scope of the appended claims should not necessarily be limited to the description of the preferred versions contained herein.

What is claimed is:

1. A method for reducing water production from a wellbore, the method comprising the steps of:
   (a) injecting a hydrophilic polymer-containing organic carrier fluid into at least a portion of a subterranean formation and
   (b) injecting a crosslinking agent-containing fluid into at least a portion of the subterranean formation, wherein the crosslinking agent reacts with the polymer to form a gel in at least a portion of the subterranean formation and the organic carrier fluid is substantially immiscible in water.

2. The method of claim 1 wherein steps (a) and (b) are performed simultaneously, the hydrophilic polymer and crosslinking agent being present in the same organic carrier fluid.

3. The method of claim 2 wherein the hydrophilic polymer- and crosslinking agent-containing organic carrier fluid comprises about 0.5 to about 75 weight percent hydrophilic polymer based on the combined weight of the organic carrier fluid and the hydrophilic polymer and about 0.003 to about 1 part by weight crosslinking agent per part by weight hydrophilic polymer.

4. The method of claim 2 wherein the hydrophilic polymer- and crosslinking agent-containing organic carrier fluid comprises about 0.75 to about 20 weight percent hydrophilic polymer based on the combined weight of the organic carrier fluid and the hydrophilic polymer and about 0.01 to about 0.1 part by weight crosslinking agent per part by weight hydrophilic polymer.

5. The method of claim 2 wherein the hydrophilic polymer- and crosslinking agent-containing organic carrier fluid comprises about 1 to about 5 weight percent hydrophilic polymer based on the combined weight of the organic carrier fluid and the hydrophilic polymer and about 0.03 to about 0.06 part by weight crosslinking agent per part by weight hydrophilic polymer.

6. The method of claim 1 wherein the organic carrier fluid comprises a petroleum derivative selected from the group consisting of kerosene, diesel oil, mineral oil, lube oil, and crude oil.

7. The method of claim 1 wherein the organic carrier fluid comprises a solvent selected from the group consisting of toluene and xylene.

8. A method for reducing water production from a wellbore, the method comprising the steps of:
   (a) injecting a hydrophilic polymer-containing organic carrier fluid into at least a portion of a subterranean formation and
   (b) injecting a crosslinking agent-containing fluid into at least a portion of the subterranean formation,
   wherein the crosslinking agent reacts with the polymer to form a gel in at least a portion of the subterranean formation and steps (a) and (b) are performed sequentially with step (a) being performed prior to step (b).

9. The method of claim 8 further comprising the step (c) of removing water from the wellbore prior to performing steps (a) and (b).

10. The method of claim 8 further comprising the step (c) of injecting an organic fluid into at least a portion of the subterranean formation prior to performing steps (a) and (b).

11. The method of claim 8 further comprising the step (c) of injecting a displacing fluid into the wellbore after performing steps (a) and (b).

12. The method of claim 8 wherein the hydrophilic polymer is selected from the group consisting of polyvinyl polymers, polymethacrylamides, cellulose ethers, polysaccharides, and ammonium salts and alkali metal salts thereof.

13. The method of claim 8 wherein the hydrophilic polymer is selected from the group consisting of acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxyalkylcelluloses, carboxyalkylhydroxyethyl celluloses, hydroxyethylcellulose, galactomannans, substituted galactomannans, heteropolysaccharides obtained by the fermentation of starch-derived sugar, and ammonium and alkali metal salts thereof.

14. The method of claim 8 wherein the hydrophilic polymer is selected from the group consisting of hydroxypropyl guar, partially hydrolyzed polyacrylamides, acrylic acid-acrylamide copolymers, xanthan gum, polyvinyl alcohol, and the ammonium and alkali metal salts thereof.

15. The method of claim 8 wherein the crosslinking agent is selected from the group consisting of aldehydes, dialdehydes, phenols, substituted phenols, ethers, polyvalent metals, chelated polyvalent metals, and compounds capable of yielding polyvalent metals.

16. The method of claim 8 wherein the crosslinking agent is selected from the group consisting of phenol, resorcinol, glutaraldehyde, catechol, formaldehyde, divinylether, chromium salts, aluminates, gallates, dichromates, titanium chelates, aluminum citrate, chromium citrate, chromium acetate, chromium lactate, and chromium propionate.

17. The method of claim 8 wherein the crosslinking agent-containing fluid comprises an organic-based fluid containing a crosslinking agent.

18. The method of claim 8 wherein the crosslinking agent-containing fluid comprises an organic-based fluid containing a crosslinking agent, the organic-based fluid being selected from the group consisting of organic carrier fluid solutions, water-in-oil emulsions, and dispersions.

19. A method for reducing water production from a wellbore, the method comprising the steps of:
   (a) injecting a hydrophilic polymer-containing organic carrier fluid into at least a portion of a subterranean formation;
   (b) injecting a crosslinking agent-containing fluid into at least a portion of the subterranean formation; and
   (c) injecting an organic spacer fluid into at least a portion of the subterranean formation between steps (a) and (b),
   wherein the crosslinking agent reacts with the polymer to form a gel in at least a portion of the subterranean formation.

20. The method of claim 19 wherein the crosslinking agent-containing fluid is an aqueous-based fluid.

21. The method of claim 19 wherein the crosslinking agent-containing fluid is an aqueous-based fluid and the steps are sequentially conducted in the order (a), (c), (b).

22. A method for reducing water production from a wellbore, the method comprising the sequential steps of:
   (a) introducing an organic fluid into at least a portion of the wellbore to remove water from the wellbore;
   (b) injecting a crosslinkable, hydrophilic polymer-containing organic carrier fluid into at least a portion of a subterranean formation;
   (c) injecting an organic spacer fluid into at least a portion of the subterranean formation;
   (d) injecting a crosslinking agent-containing fluid into at least a portion of the subterranean formation; and
   (e) injecting a displacing fluid into at least the wellbore to displace the crosslinking agent-containing fluid into at least a portion of the subterranean formation, wherein the crosslinking agent reacts with the polymer to form a gel in at least a portion of the subterranean formation.

23. The method of claim 22 further comprising the step (d.1) of injecting an organic spacer fluid after step (d) and then sequentially repeating steps (b) through (d.1) one or more times prior to performing step (e).

24. A method for reducing water production from a wellbore, the method comprising the steps of:
(a) injecting a hydrophilic polymer-containing organic carrier fluid into at least a portion of a subterranean formation and
(b) injecting a crosslinking agent-containing fluid into at least a portion of the subterranean formation, wherein the crosslinking agent is capable of reacting with the polymer in the presence of water to form a gel and steps (a) and (b) are performed sequentially with step (a) being performed prior to step (b).

25. A method for reducing water production from a wellbore, the method comprising the sequential steps of:
(a) introducing an organic fluid into at least a portion of the wellbore to remove water from the wellbore;
(b) injecting a crosslinkable, hydrophilic polymer-containing organic carrier fluid into at least a portion of a subterranean formation;
(c) injecting a first organic spacer fluid into at least a portion of the subterranean formation;
(d) injecting a crosslinking agent-containing fluid into at least a portion of the subterranean formation;
(e) injecting a second organic spacer fluid into at least a portion of the subterranean formation; and
(f) sequentially repeating steps (b) through (e) one or more times, wherein the crosslinking agent reacts with the polymer to form a gel in at least a portion of the subterranean formation.

26. A method for reducing water production from a wellbore, the method comprising the steps of:
(a) injecting a hydrophilic polymer-containing organic carrier fluid into at least a portion of a subterranean formation and
(b) injecting a crosslinking agent-containing fluid into at least a portion of the subterranean formation, wherein the crosslinking agent reacts with the polymer to form a gel in at least a portion of the subterranean formation and the crosslinking agent-containing fluid comprises a water-based fluid containing a water soluble crosslinking agent.

27. The method of claim 26 wherein the crosslinking agent-containing fluid comprises a water-based fluid containing a water soluble crosslinking agent selected from the group consisting of polyvalent metals, aldehydes, phenol, and substituted phenols.

28. A method for reducing water production from a wellbore, the method comprising the step of injecting into at least a portion of a subterranean formation an organic carrier fluid comprising (i) a crosslinkable, hydrophilic polymer and (ii) about 0.003 to about 0.03 part by weight crosslinking agent per part by weight crosslinkable, hydrophilic polymer.

29. A method for reducing water production from a wellbore, the method comprising the steps of:
(a) injecting a hydrophilic polymer-containing organic carrier fluid into at least a portion of a subterranean formation and
(b) injecting a crosslinking agent-containing fluid into at least a portion of the subterranean formation, wherein the polymer is selected from the group consisting of polyvinyl alcohol, polyvinyl acetate, polyvinyl pyrrolidone, polyalkyleneoxides, and ammonium and alkali metal salts thereof.

30. The method of claim 29 wherein the polymer is selected from the group consisting of polyvinyl alcohol and ammonium and alkali metal salts thereof.

31. The method of claim 29 wherein the polymer is selected from the group consisting of polyvinyl acetate and ammonium and alkali metal salts thereof.

32. The method of claim 29 wherein the polymer is selected from the group consisting of polyvinyl pyrrolidone and ammonium and alkali metal salts thereof.

33. The method of claim 29 wherein the polymer is selected from the group consisting of polyalkyleneoxides and ammonium and alkali metal salts thereof.

34. A method for reducing water production from a wellbore, the method comprising the steps of:
(a) injecting a hydrophilic polymer-containing water-in-oil emulsion into at least a portion of a subterranean formation and
(b) injecting a crosslinking agent-containing fluid into at least a portion of the subterranean formation.

35. A method for reducing water production from a wellbore, the method comprising the steps of:
(a) injecting a hydrophilic polymer-containing organic carrier fluid into at least a portion of a subterranean formation and
(b) injecting a crosslinking agent-containing fluid into at least a portion of the subterranean formation, wherein the cross-linking agent is selected from the group consisting of organic crosslinking agents and chromium salts, aluminates, gallates, titanium chelates, aluminum citrate, chromium citrate, chromium acetate, chromium lactate, and chromium propionate.

36. The method of claim 35 wherein the crosslinking agent comprises an organic crosslinking agent.

37. The method of claim 35 wherein the crosslinking agent comprises an organic crosslinking agent selected from the group consisting of aldehydes, dialdehydes, phenols, substituted phenols, and ethers.

38. The method of claim 35 wherein the crosslinking agent comprises an organic crosslinking agent selected from the group consisting of phenol, resorcinol, glutaraldehyde, catechol, formaldehyde, and divinylether.

39. The method of claim 35 wherein the crosslinking agent comprises an inorganic crosslinking agent selected from the group consisting of chromium salts, aluminates, gallates, titanium chelates, aluminum citrate, chromium citrate, chromium acetate, chromium lactate, and chromium propionate.

40. A method for reducing water production from a wellbore, the method comprising the steps of:
(a) injecting a hydrophilic polymer-containing organic carrier fluid into at least a portion of a subterranean formation;
(b) injecting a crosslinking agent-containing fluid into at least a portion of the subterranean formation; and
(c) injecting an organic spacer fluid into at least a portion of the subterranean formation between steps (a) and (b), wherein the crosslinking agent is capable of reacting with the polymer in the presence of water to form a gel.

* * * * *